(12) United States Patent
Selph et al.

(10) Patent No.: US 9,088,815 B2
(45) Date of Patent: Jul. 21, 2015

(54) MESSAGE INJECTION SYSTEM AND METHOD

(75) Inventors: Douglas Scott Selph, Chicago, IL (US); Mark Dyer, Berkshire (GB); Enrique J. Wong, San Jose, CA (US); Kenneth F. Wolfinger, Skokie, IL (US); Charles M. Kellerhals, Gurnee, IL (US); Bradley T. Kranz, Slingerlande, NY (US); Daniel Patrick Quigley, Woodinville, WA (US); John T. Braun, Vernon Hills, IL (US); Lars S. Sorensen, Algonquin, IL (US); Jason D. Shah, Chicago, IL (US); Michael Unetich, Chicago, IL (US)

(73) Assignee: TIP SOLUTIONS, INC., Buffalo Grove, IL (US)

( * ) Notice: Subject to any disclaimer, the term of this patent is extended or adjusted under 35 U.S.C. 154(b) by 106 days.

(21) Appl. No.: 13/347,476

(22) Filed: Jan. 10, 2012

(65) Prior Publication Data

US 2013/0130656 A1    May 23, 2013

Related U.S. Application Data

(63) Continuation-in-part of application No. 13/298,961, filed on Nov. 17, 2011.

(51) Int. Cl.
*H04W 4/12* (2009.01)
*H04N 21/414* (2011.01)
(Continued)

(52) U.S. Cl.
CPC ..... *H04N 21/41407* (2013.01); *H04N 21/4396* (2013.01); *H04N 21/4622* (2013.01); *H04L 51/02* (2013.01); *H04L 51/14* (2013.01); *H04L 67/12* (2013.01); *H04M 3/42042* (2013.01); *H04W 4/22* (2013.01)

(58) Field of Classification Search
CPC ............. H04M 1/6066; H04M 1/271; H04M 1/72552; H04M 2250/02; H04M 2250/74; H04B 1/385; H04B 2001/3866; H04W 4/14; H04W 8/18
USPC ................ 455/412.1, 458, 426.1, 415, 414.1
See application file for complete search history.

(56) References Cited

U.S. PATENT DOCUMENTS 6,219,414 B1   4/2001   Maciejewski et al.
6,393,272 B1   5/2002   Cannon et al.
(Continued)

FOREIGN PATENT DOCUMENTS

KR   10-2006-0050668 A   5/2006
WO       2005083995 A1   9/2005
WO       2008110831 A1   9/2008

OTHER PUBLICATIONS

Mason Inman, Welcome to the Open Source Cellphone, http://www.tmcnet.com/usubmit/2006/03/10/1447852.htm, Mar. 10, 2006.
(Continued)

*Primary Examiner* — Chuong A Ngo
(74) *Attorney, Agent, or Firm* — Levenfeld Pearlstein, LLC (57) ABSTRACT

A message injection apparatus including a memory, a processor, a connection unit communicatively coupled to a communication device, and an application operating in the memory that is configured to receive audio signals from the communication device and to transmit at least one audio signal to the communication unit based on an operational mode.

13 Claims, 9 Drawing Sheets

(51) Int. Cl.
*H04N 21/439* (2011.01)
*H04N 21/462* (2011.01)
*H04L 12/58* (2006.01)
*H04W 4/22* (2009.01)
*H04L 29/08* (2006.01)
*H04M 3/42* (2006.01)

(56) References Cited

U.S. PATENT DOCUMENTS

| | | | |
|---|---|---|---|
| 6,430,269 | B1 | 8/2002 | Kanerva |
| 6,470,196 | B1 | 10/2002 | Yamashita |
| 6,574,471 | B1 | 6/2003 | Rydbeck |
| 6,633,634 | B1 | 10/2003 | Crockett et al. |
| 6,654,615 | B1 | 11/2003 | Chow et al. |
| 6,728,558 | B1 | 4/2004 | Kubo et al. |
| 6,738,467 | B1 | 5/2004 | Infosino |
| 6,760,581 | B2 | 7/2004 | Dutta |
| 6,782,252 | B1 | 8/2004 | Kang et al. |
| 6,829,343 | B2 | 12/2004 | Maciejewski et al. |
| 6,850,604 | B2 | 2/2005 | Cannell et al. |
| 6,975,709 | B2 | 12/2005 | Wullert, II |
| 7,006,618 | B1 | 2/2006 | Shaffer et al. |
| 7,010,288 | B2 | 3/2006 | Brown et al. |
| 7,110,789 | B1 | 9/2006 | Curtiss et al. |
| 7,139,383 | B2 | 11/2006 | Maciejewski et al. |
| 7,231,232 | B2 | 6/2007 | Osann, Jr. |
| 7,254,226 | B1 | 8/2007 | Roberts et al. |
| 7,330,713 | B2 | 2/2008 | Zhu |
| 7,330,721 | B2 | 2/2008 | Bhatia et al. |
| 7,388,952 | B2 | 6/2008 | Maciejewski et al. |
| 7,391,859 | B2 | 6/2008 | Crockett et al. |
| 7,957,772 | B2 | 6/2011 | Charlier et al. |
| 2002/0061097 | A1 | 5/2002 | Kanerva |
| 2003/0054865 | A1 | 3/2003 | Byers et al. |
| 2003/0100261 | A1 | 5/2003 | Gusler et al. |
| 2003/0153304 | A1 | 8/2003 | Kim |
| 2003/0190028 | A1 | 10/2003 | Maciejewski et al. |
| 2003/0207703 | A1* | 11/2003 | Liou et al. .................. 455/575.2 |
| 2004/0137883 | A1 | 7/2004 | Crockett et al. |
| 2004/0203794 | A1 | 10/2004 | Brown et al. |
| 2004/0214553 | A1 | 10/2004 | Kang et al. |
| 2005/0147212 | A1 | 7/2005 | Benco et al. |
| 2007/0207796 | A1* | 9/2007 | Yan ................ 455/420 |
| 2007/0213100 | A1 | 9/2007 | Osann, Jr. |
| 2008/0076395 | A1 | 3/2008 | Bhatia et al. |
| 2008/0097775 | A1* | 4/2008 | Kim ................ 705/1 |
| 2008/0146199 | A1 | 6/2008 | Horodezky et al. |
| 2008/0205619 | A1 | 8/2008 | Kalaboukis et al. |
| 2008/0304637 | A1 | 12/2008 | Ganganna |
| 2009/0010415 | A1 | 1/2009 | Ustby |
| 2009/0017877 | A1* | 1/2009 | Lin ................ 455/570 |
| 2009/0122967 | A1 | 5/2009 | Loisch et al. |
| 2010/0105446 | A1* | 4/2010 | Charlier et al. ............ 455/569.1 |
| 2010/0190438 | A1* | 7/2010 | Chen ................ 455/41.2 |
| 2010/0293462 | A1* | 11/2010 | Bull et al. ............ 715/716 |
| 2011/0014957 | A1* | 1/2011 | Sugimori et al. .......... 455/569.1 |
| 2011/0111735 | A1 | 5/2011 | Pietrow |
| 2011/0151838 | A1 | 6/2011 | Olincy et al. |
| 2011/0153323 | A1* | 6/2011 | Kim et al. .................. 704/235 |

OTHER PUBLICATIONS

International Search Report and Written Opinion of the International Searching Authority issued in connection with PCT/US2010/056977 on Jul. 28, 2011.

International Search Report and Written Opinion of the International Search Authority issued Apr. 30, 2013 in connection with PCT/US2013/020662.

* cited by examiner

MESSAGE INJECTION SYSTEM AND METHOD

CROSS REFERENCE TO RELATED APPLICATIONS

This application is a continuation in part application of U.S. patent application Ser. No. 13/298,961, filed Nov. 17, 2011, which is incorporated by reference herein in its entirety.

BACKGROUND OF THE INVENTION

1. Field of the Invention

The present invention is directed to a device and method for injecting media information into a cellular communication.

2. Background of the Invention

Devices capable of sending and receiving communications, such as phone calls, text messages, electronic mail, instant messaging requests, and other electronic updates and information are becoming increasingly prevalent. Such devices come in a wide variety and may be generally stationary, such as a desktop computer, TV/Set-Top box, static game console, etc., or may be easily portable, such as a smart phone, tablet computer, notebook computer, personal digital assistant ("PDA"), portable game console, portable media device, etc. Further, such devices may send and receive communications through a wide variety of wired or wireless connections, standards, or protocols, such as the Internet, an intranet, voice over internet protocol ("VOIP"), satellite, 3G, SMS, MMS, 4G, WIMAX, etc.

The ability to record audio messages and store these messages in the memory of these devices is widely known. In addition, the ability to encode live audio and route the live audio to a network, such as a cellular network, is also widely known. However, current devices do not allow the transmission of stored audio to a cellular network. Accordingly, only live audio streams can be uplinked to a cellular network. Because of this gap, a mobile communication device is dependent on the network it is connected to for storage of audio messages transmitted from the network, such as a voice mail server. This limits the use of audio recordings on cellular devices. Consequently, there is a need for device that has the ability to transmit recorded media information to devices on a wireless network.

SUMMARY OF THE INVENTION

Various embodiments of the present invention include a message injection apparatus including a memory, a processor, a connection unit communicatively coupled to a communication device, and an application operating in the memory that is configured to receive audio signals from the communication device and to transmit at least one audio signal to the communication unit based on an operational mode These and other features and advantages of the present invention will be apparent from the following detailed description, in conjunction with the appended claims.

BRIEF DESCRIPTION OF THE DRAWINGS

Details of the present invention, including non-limiting benefits and advantages, will become more readily apparent to those of ordinary skill in the relevant art after reviewing the following detailed description and accompanying drawings, wherein.

DETAILED DESCRIPTION

While the present invention is susceptible of embodiment in various forms, there is shown in the drawings and will hereinafter be described one or more embodiments with the understanding that the present disclosure is to be considered illustrative only of the invention and is not intended to limit the invention to any specific embodiment disclosed herein.

The present disclosure is directed to one or more communication devices capable of transmitting an audio signal over a wireless network, such as a cellular network, to a second device. The transmission of the audio signal may be part of a larger communication management system which is used to notify callers that the user of the mobile communication device is unavailable. The audio signal may be sent as a single transmission, or may be appended to another audio signal that was received in real time.

Figure 1:
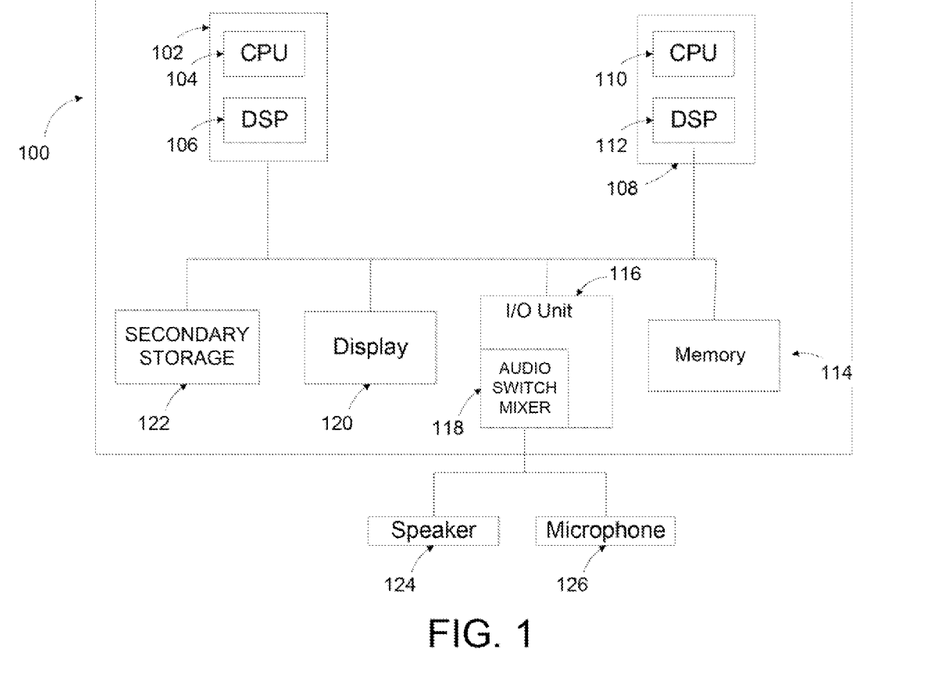
FIG. 1 illustrates a schematic representation of a mobile communication device.

FIG. 1 illustrates a mobile communication device 100. The mobile communication device 100 includes an application processing unit 102 that includes a central processing unit (CPU) 104 and a digital signal processor (DSP) 106, a radio communication unit 108 that includes a CPU 110 and DSP 112, a memory 114, an input output (IO) unit 116 that includes an audio switch unit 118, a display 120, and a secondary storage unit 122. The radio communication unit 108 is configured to communicate across a wireless network. The radio communication unit 108 may be configured to communicate over a wireless cellular network using any cellular protocol including, but not limited to, code division multiple access (CDMA), global system for mobile communications (GSM), and universal mobile telecommunications system (UMTS), Short Message Service (SMS), Multimedia Messaging Service (MMS), Long Term Evolution (LTE) or any other cellular communication protocol. The radio communication unit may also communicate over different networks including satellite networks, 3G cellular networks, 4G cellular networks, WIMAX networks, or any other network.

The IO Unit 116 is coupled to a speaker 124 and a microphone 126 via the audio switch unit 118. The audio switch unit 118 is configured to receive an audio signal from the microphone 126, and to adjust various characteristics of the received audio signal. The audio switch unit 118 may adjust the volume of the audio, side tone generation, comfort noise generation, echo cancelation, automatic gain, noise suppression, tone generation, or any other characteristic of the audio signal. The audio switch unit 118 also routes audio signals received by the microphone 126 to the application processing unit 102, or the radio communication unit 108, and also routes audio from the application processing unit 102 and radio communication unit 108 to the speaker 124.

Figure 2:
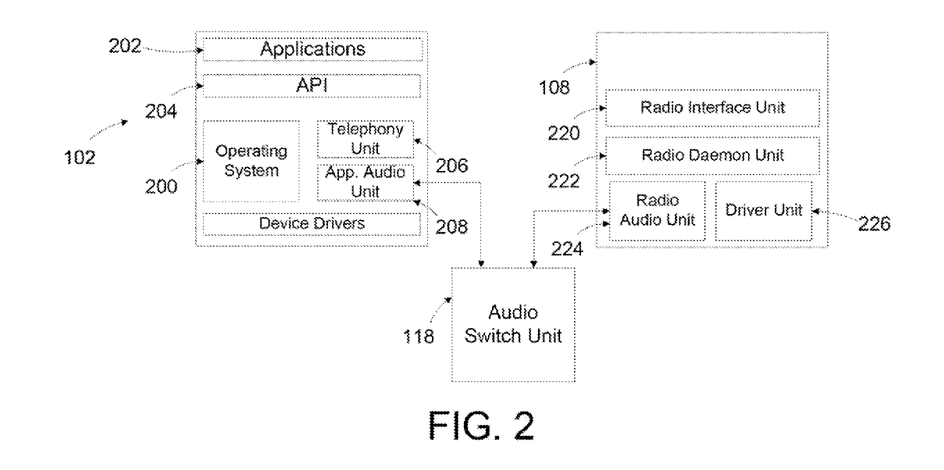
FIG. 2 illustrates a schematic representation of the interaction between an application processing unit and radio communication unit in the mobile communication device of FIG. 1.

FIG. 2 illustrates a schematic representation of the interaction between the application processing unit 102 and radio communication unit 108. The application processing unit 102 includes an operating system 200 running in the CPU 104 of the application processing unit 102. The operating system 200 may be any commercially available operating system including Linux, Windows Mobile, Google Android, or any other operating system capable of running on a mobile device. The operating system 200 controls the operation of the CPU 104 and DSP 106 in the application processing unit 102. An application 202 operating in the operating system 200 interacts with different components of the mobile device 100, such as the display 120, speaker 124, and microphone 126, via an application programming interface (API) 204.

The radio communication unit 108 includes a radio interface unit 220, a radio daemon unit 222, a radio audio unit 224, and a driver unit 226 operating via the CPU 110 and DSP 112. The radio audio unit 224 is communicatively coupled to the audio switch unit 118, such that the audio switch unit 118 transmits audio captured by the microphone 126 for transmission over the wireless network by radio hardware coupled to the driver unit 226. The radio audio unit 224 also transmits audio information received from the radio hardware via the driver unit 226 to the speaker 126 via the audio switch unit 118.

The radio interface unit 220 performs high level operations to initiate a connection between the mobile device 100 and another device connected to the wireless network via the driver unit 226. The radio interface unit 220 is also communicatively coupled to a telephony unit 206 in the application processing unit 102. As an illustrative example, the radio interface unit 220 may receive a command from the telephony unit 206 to initiate a phone call between two mobile devices. The radio interface unit 220 communicates with the radio audio unit 224 and driver unit 226, via the radio daemon unit 222, to connect to the wireless network and initiate a call between the two devices. The radio interface unit 220 also communicates with the telephony unit 206 to notify the telephony unit 206 that a phone call has been initiated either by the mobile device 100 or by an external device that is calling the mobile device 100. The telephony unit 206 communicates with the application 202 running in the application processing unit 102 to provide a status of the radio transmission unit 208, and to initiate actions in the radio transmission unit 108.

The radio audio unit 224 in the radio communication unit 108 is communicatively coupled to the audio switch unit 118, such that the radio audio unit 224 instructs the audio switch unit 118 to send audio signals from the microphone 126 to the radio audio unit 224, and to transmit audio signals from radio audio unit 224 to the speaker 124 via the audio switch unit 118. The hardware driver unit 226 is communicatively coupled to the radio hardware in the mobile device 100 such that the hardware driver unit 226 initiates a connection with a wireless network, via the radio hardware, and controls the transmission and receipt of audio signals onto and from the wireless network. The hardware driver unit 226 is communicatively coupled to the radio audio unit 224 via the radio interface unit 220 and the radio daemon unit 222, such that the radio audio unit 224 provides audio signals from the microphone 126 to the hardware driver unit 226 for transmission over the wireless network. The hardware driver unit 226 also transmits audio signals received from the wireless network to the radio audio unit 224 for transmission to the speaker 124.

Figure 3A:
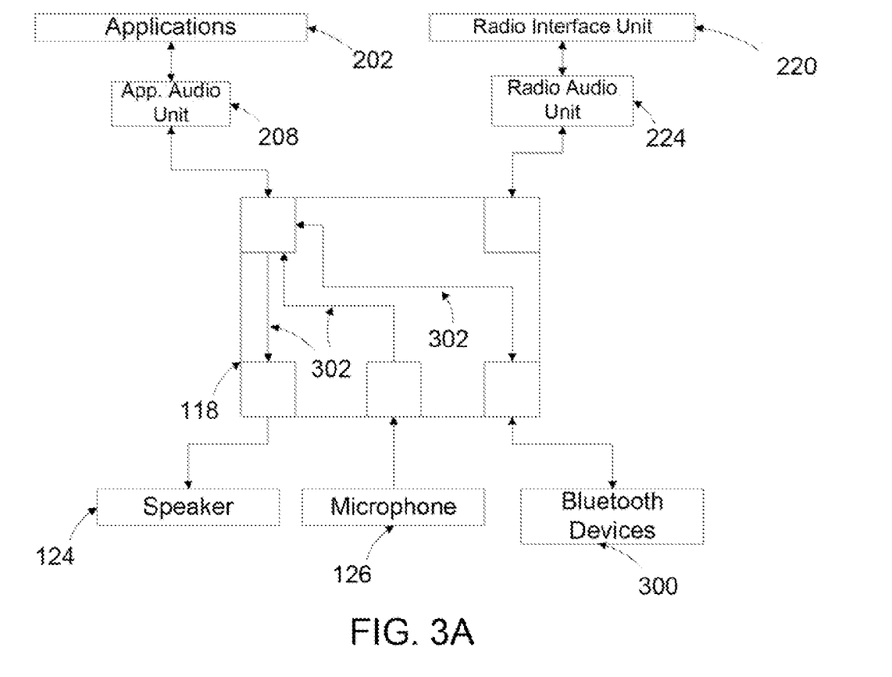
FIG. 3A illustrates a schematic representation of an audio switch unit in the mobile communication device of FIG. 1.

FIG. 3A illustrates a schematic representation of the audio switch unit 118 transmitting audio to the speaker 124 and/or microphone 126. The audio switch unit 118 is communicatively coupled to the speaker 124, the microphone 126, and an external device 300. The audio switch unit 118 receives a signal from the application 202, via the application audio unit 208, requesting the creation of an audio path 302 between the speaker 124, microphone 126 or external device 300. Upon receiving the request, the audio switch unit 118 creates an audio path 302 between the requested devices and the application audio unit 208. The application audio unit 208 applies the appropriate filters to the audio signal sent to, or received from, the audio switch unit 118, and routes the audio signal to the audio switch unit 118. The application 202 transmits audio signals to the speaker 124, or external device 300, via the audio path 302, and receives audio signals from the microphone 126, or external device 300, via the audio path. The audio signals may be in any format used to store audio including, but not limited to MP3, MPEG, WAV or any other digital audio format. The application audio unit 208 may convert the audio signals to analog audio signals before transmitting the analog audio signals to the audio switch unit 118.

Figure 3B:
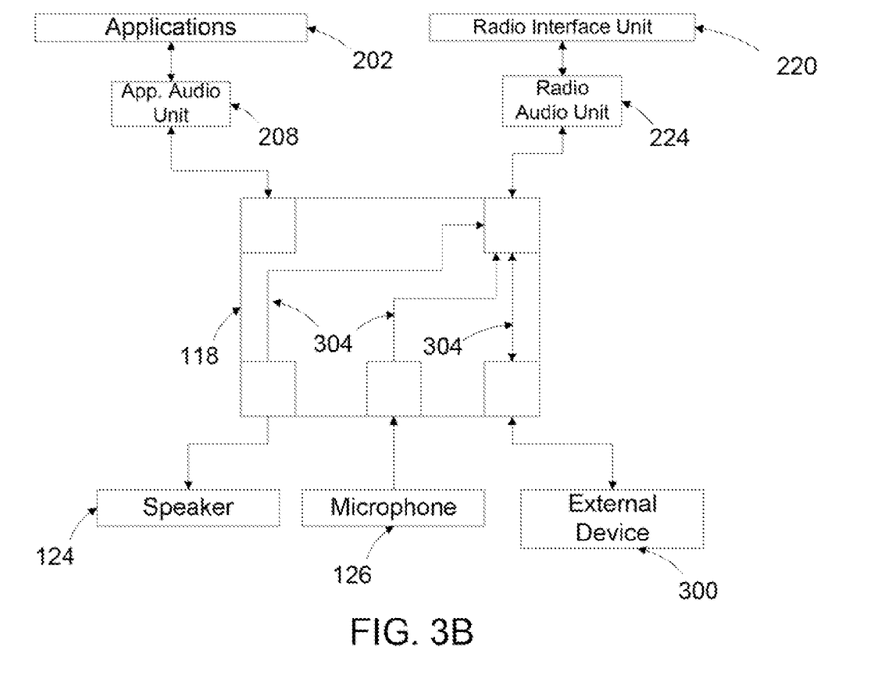
FIG. 3B illustrates a schematic representation of the audio switch unit of FIG. 3A when a telephone call is active.

FIG. 3B illustrates a schematic representation of the audio switch unit 118 when the radio transmission unit 108 is managing a call between the mobile communication device 100 and another device via a wireless network. When the audio switch unit 118 receives a signal from the radio interface unit 220, via the radio audio unit 224, to open an audio path 304 between the radio interface unit 220, the speaker 124, microphone 126, or the external device 300, the audio switch unit 118 closes all open audio paths, and opens audio paths 304 between the radio interface unit 220 and the speaker 124 and between the radio interface unit and the microphone 126, or between the radio interface unit 220 and the external device 300. The radio audio unit 224 includes all necessary filters required to prepare the audio signal received from the microphone 126 for transmission over the wireless network via the radio interface unit 220 and the driver unit 226.

Figure 4:
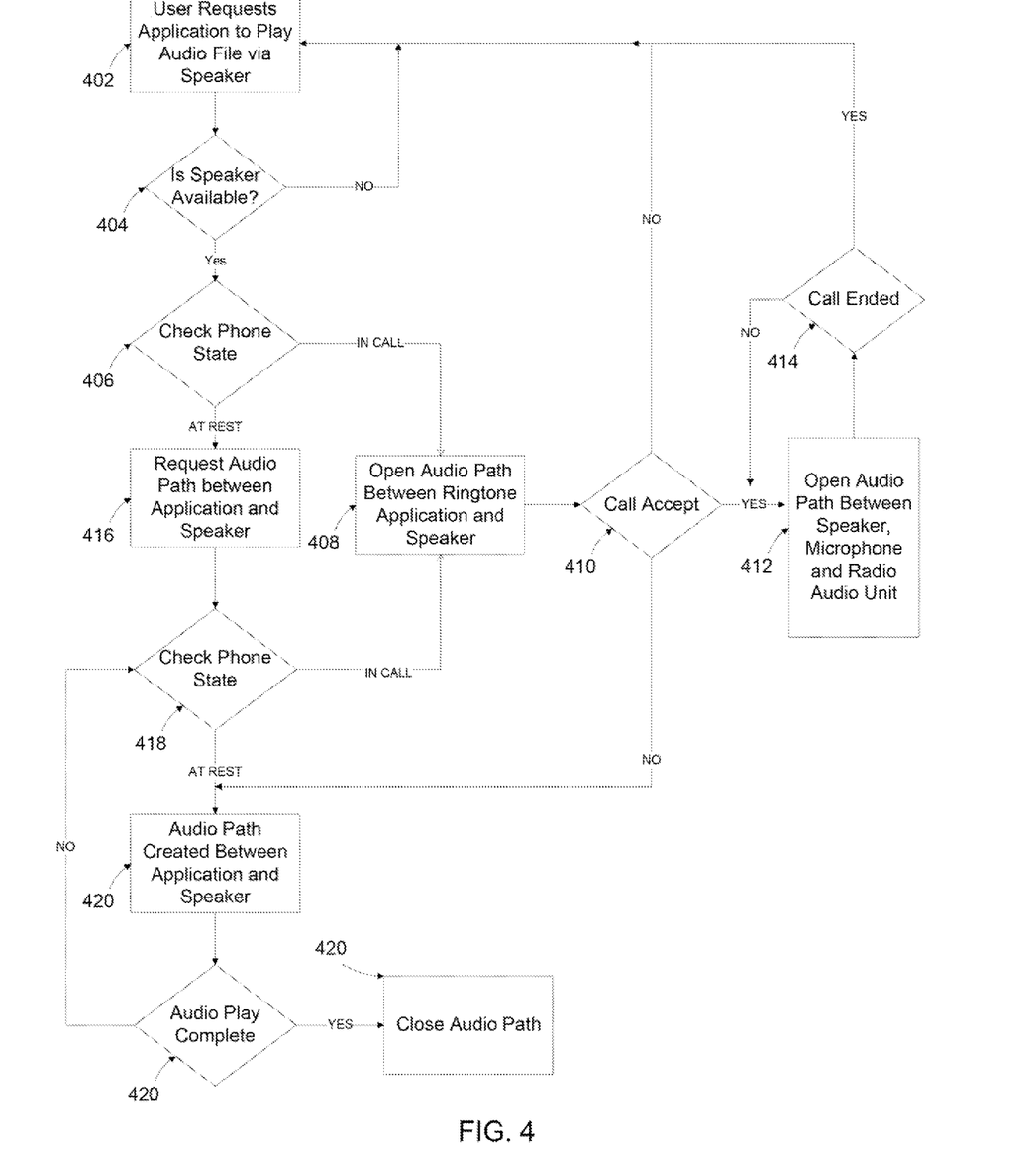
FIG. 4 depicts an illustrative example of the mobile communication device of FIG. 1 transmitting an audio signal to a speaker on the mobile communication device.

FIG. 4 depicts an illustrative example of a mobile communication device 100 transmitting an audio signal to the speaker 124. In step 402, a user requests an application 202 transmit an audio signal to the speaker 124. The application 202, in step 404, requests the status of the speaker 124 from the audio switch unit 118. If an audio path is open between the speaker 124 and the radio interface unit 220, the application 202 waits for the speaker 124 to become available. If the speaker 124 is available, the application 202 requests the status of the radio interface unit 220, via telephony unit 206, at step 406. The radio interface unit 220 returns a status of "IN CALL" indicating a telephone call is incoming, or "AT REST" indicating that the radio interface unit 220 is not currently receiving a telephone call.

If the radio interface unit 220 returns a status of "IN CALL," the application 202 directs the audio switch unit 118 to open an audio path 302 between the application 202 and the speaker 124 to transmit a pre-assigned ringtone audio signal, via the application audio unit 208, to the speaker 124 in step 408. The audio switch unit 118 closes any open audio connections to the speaker 124, and opens an audio path 302 between the application 202 and the speaker to transmit the pre-assigned audio signal to the speaker 124. While the ringtone audio signal is being transmitted to the speaker 124, the telephony unit 206 requests the caller information from the radio interface unit 220, which is passed to the application 202 for display to a user via the display 120 of the mobile device 100. The application 202 also presents buttons on the display 120 that ask the user if they would like to accept or decline the incoming call.

If the user accepts the call, via the buttons displayed by the application 202 on the display 120, the telephony unit 206 sends a signal to the radio interface unit 220 to initiate the call in step 410. The radio interface unit 220 initiates a connection to the wireless network via the driver unit 226, and instructs the audio switch unit 118 to open audio paths 304 between the radio interface unit 220, the speaker 124, and microphone 126. The audio switch unit 118 closes the audio path 302 between the application 202 and the speaker 124, and opens the audio path 304 between the speaker 124, microphone 126, and the radio interface unit 220 via the radio audio unit 224. Upon termination of the audio path 302 to the application 202, transmission of the ringtone audio signal by the application 202 is terminated. In step 414, the radio interface unit 220 waits for the call to terminate before sending a signal to the telephony unit 206 that the call has ended. Once the call has ended the application 202 returns to step 402, and the audio switch unit 118 closes the audio path 304 between the radio interface unit 220, the speaker 124, and the microphone 126.

In step 416, if the radio interface unit 220 returns an indication that the phone is "AT REST," the application 202 opens an audio path 302 between the application 202 and the speaker 124 via the application audio unit 208 and the audio switch unit 118. In step 418, the application 202 checks the status of the radio interface unit 220, via the telephony unit 206, to confirm the radio interface unit 220 is not receiving a telephone call. While the audio signal is transmitted to the speaker 124, the application 202 checks the status of the radio interface unit 220 via the telephony unit 206. If the radio interface unit 220 is still "AT REST," the application 202 transmits the audio signal to the speaker 124 via the application audio unit 208 and the audio switch unit 118, in step 420. If the radio interface unit 220 transmits an "IN CALL" flag to the telephony unit 206, the transmission of the audio signal to the speaker 124 stops, and the process moves to step 408. In step 422, the application 202 keeps the audio path 302 open while the audio signal is transmitted to the speaker 124 and the radio interface unit 220 remains at rest, and closes the audio path 302, in step 424, when the audio signal transmission is complete.

Figure 5A:
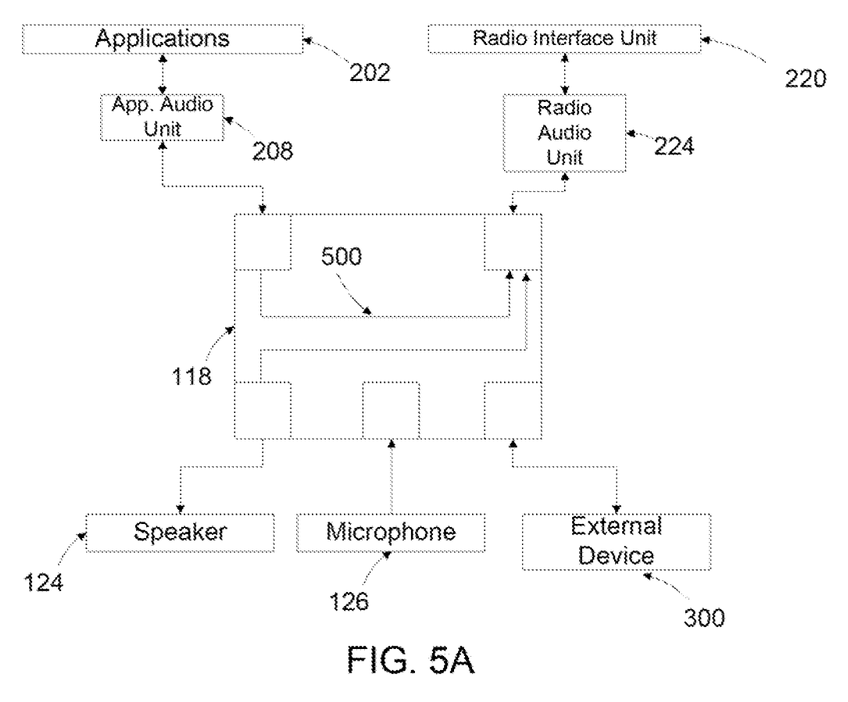
FIG. 5A depicts the audio switch unit in the mobile communication device of FIG. 1 with an audio path opened between the application audio unit and radio audio unit.
Figure 5B:
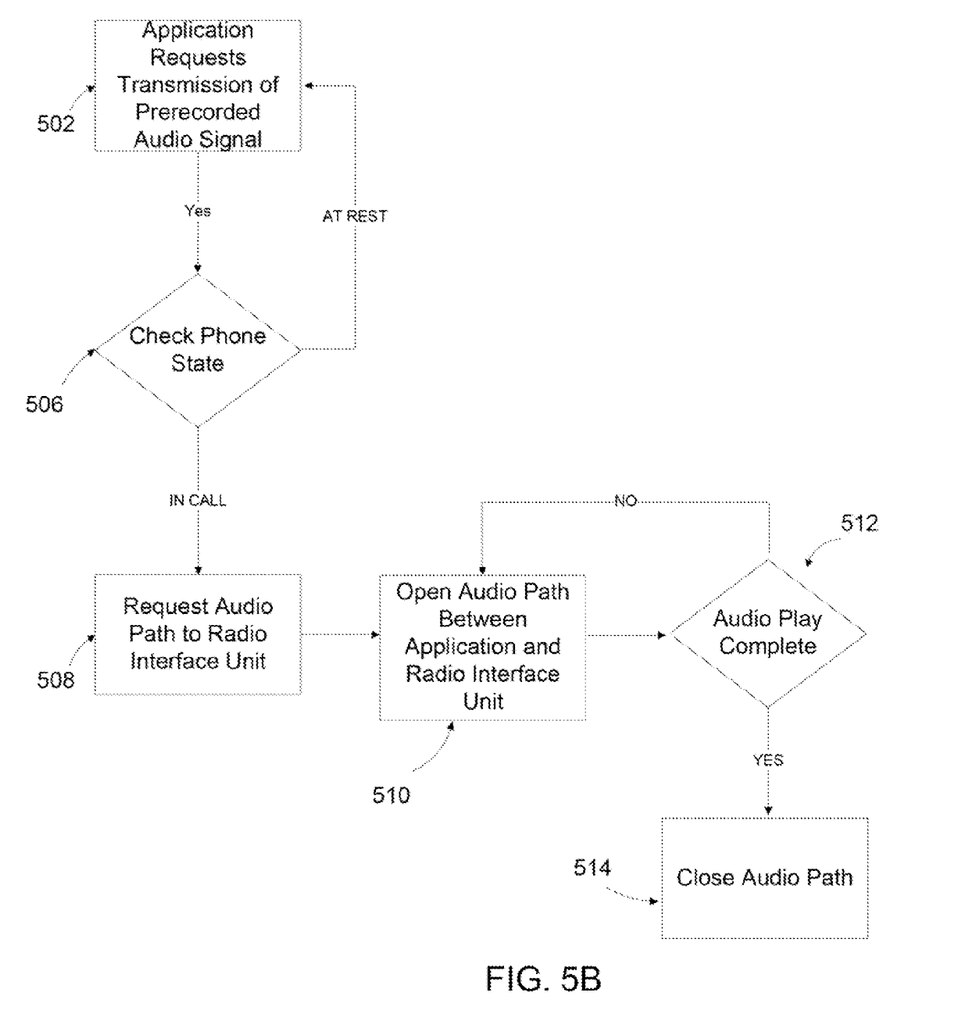
FIG. 5B depicts a schematic representation of a process used to transmit a prerecorded audio file over a wireless network via the radio interface unit in the mobile communication device of FIG. 1.

FIG. 5A depicts the audio switch unit 118 with an audio path 500 opened between the application audio unit 208 and radio audio unit 224. This configuration allows for an application 202 to send a pre-recorded audio signal to the radio interface unit 220 for transmission across the wireless network. FIG. 5B depicts a schematic representation of the process used to transmit a prerecorded audio signal over a wireless network via the radio interface unit 220. In step 502, the application 202 requests the transmission of a prerecorded audio signal over the wireless network via the radio interface unit 220. In step 504, the application 202 checks the status of the radio interface unit 220 via the telephony unit 206. If the radio interface unit 220 returns an "AT REST" status, the application 220 returns to step 502 to wait for a call to be initiated. If the radio interface unit 220 returns an "IN CALL" status, the application 202 requests the audio path 500 be opened between the radio interface unit 220 and the application 202 in step 508. The application may also initiate a call to another device via the telephony unit 206, by sending an "INITIATE CALL" flag to the radio interface unit 226.

In step 510, the audio switch unit 118 opens an audio path 500 between the application 202 and the radio interface unit 220, by first closing the audio path 304 between the radio interface unit 220 and the microphone 126, and opening the path between the application 202 and the radio interface unit 220 via the application audio unit 208 and the radio audio unit 224. In step 512, the application 202 transmits the audio signal through the audio path 500 via the application audio unit 208. The radio audio unit 224 receives the audio signal from the application audio unit 208, and passes the audio signal through a plurality of filters that prepare the audio signal for transmission over the wireless network, via the hardware driver unit 226. After the audio signal transmission is complete, the audio switch unit 118 may close the audio path 500. The application 202 may also keep the audio path 500 open until the radio interface unit 220 indicates that the call is terminated. If the audio path 500 remains open while the call is active, audio received from the wireless network may be sent to the application 202 where it may be saved in the memory 114, or the secondary storage unit 122, of the mobile communications device 100.

Figure 5C:
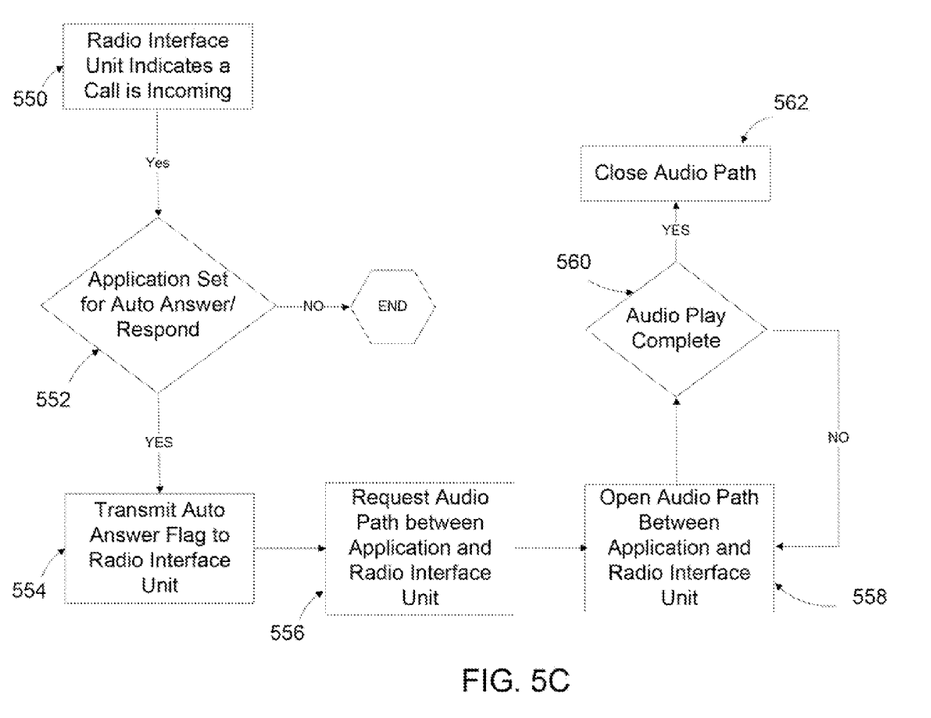
FIG. 5C depicts a schematic representation of a process used to transmit an analog signal from an application in the mobile communication device of FIG. 1 to the wireless network when a call is received by the mobile communication device of FIG. 1.

FIG. 5C depicts a schematic representation of the process used to transmit an analog signal from an application 202 to the wireless network when a call is received. In step 550, the application 202 receives an indication from the radio interface unit 220 that a call is incoming. The radio interface unit 220 may transmit an "IN CALL" flag to the application 202 via the telephony unit 206. The radio interface unit 220 may also transmit information on the call such as, but not limited to caller identification information, caller location, or any other information related to the call to the application 202 via the telephony unit 206. In step 552, the application 202 confirms it is configured to auto answer an incoming call. The application 202 may use the caller information transmitted by the radio transmission unit 220 to determine if the call is to be auto answered. As an illustrative example, the application 202 may only answer calls from callers on a predefined caller list that is stored in the memory 114 of the device 100. The application 202 may also ignore calls from users on the caller list. The application 202 may also prompt a user of the mobile communication device 100 whether to answer the call by displaying a message on the display 120. If the application is not configured for auto answer, the application 202 ends. If the application 202 is configured to auto answer a call, the telephony unit 206 transmits an "AUTO ANSWER" flag to the radio interface unit 220.

In step 554, the radio interface unit 220, receives the "AUTO ANSWER" flag and does not request an audio path between the speaker 124, the microphone 126, or the external device 300. In step 556, the application 202 requests an audio path 500 between the application and the radio interface unit 220 via the application audio unit 208. In step 558, the audio switch unit 118 opens the audio path 500, and the radio interface unit 220 initiates the call over the opened audio path 500. The application 202 transmits the audio signal over the audio path 500 through the application audio unit 208 and the radio audio unit 224 after the radio interface unit 220 confirms the call is initiated via the telephony unit 206, and the driver unit 226 receives the audio signal from the radio interface unit 220, via the radio audio unit 224, and transmits the audio signal over the wireless network.

In step 560, the application 202 determines if the audio signal has completely transmitted over the audio path 500. If the audio signal has completely transmitted, the application 202 may request the audio path 500 be closed. The application 202 may also terminate the call by transmitting an "END CALL" flag from the telephony unit 206 to the radio interface unit 220. The application 202 may also maintain the audio path 500 until the user of the mobile device 100 receives the call by pressing a button displayed by the application 202 on the display 120 of the mobile communication device 100. If the user indicates that they would like to receive the call, the application 202 transmits an "IN CALL" flag to the radio interface unit 220, which requests the audio switch unit 118 close audio path 500 and open audio path 304.

The application 202 may analyze information from additional sources, such as a schedule application residing in, or external to, the mobile communication device 100, global positioning satellite (GPS) information, or any other user specific information to determine if the "AUTO ANSWER" flag should be turned on. As an illustrative example, the application 202 may query a scheduling application on the mobile communication device 100 to determine if the "AUTO ANSWER" flag should be turned on. The application 202 may transmit the "AUTO ANSWER" flag to the radio interface unit 220 when a user receives a call when they are in a scheduled event. To determine if the user is in a scheduled event, the application 202 may compare the current time and date to a starting and ending time and date in the user's schedule to determine if the event is in progress. If the event is in progress, the application will send the "AUTO ANSWER" flag to the radio interface unit when a call is in coming.

The user may also supply a listing of authorized phone numbers that should not be auto answered during the event. As another illustrative example, a user may designate a specific phone number to pass through to the phone during the event such as a family member, or a client, calling the user. When the indicated phone number is transferred to the telephony unit 206 from the radio interface unit 220, as part of the call information, the application 202 will transmit an "ACCEPT CALL" signal to the radio interface unit 220 instructing the radio interface unit 220 to open the audio path to the speaker 124 and microphone 126. The application 202 will not open an audio path between the radio interface unit 220 and the speaker 124 if the caller information is not in the list of authorized phone numbers.

The application 202 may also look to multiple pieces of information to determine if the "AUTO ANSWER" flag should be transmitted to the radio interface unit 220. As an illustrative example, the application 202 may analyze the schedule information and the GPS position of the user to determine if the user is at the location of the meeting. If the user is at the location of the meeting, the "AUTO ANSWER" flag is transmitted to the radio interface unit 220 when a call is incoming. If the user is not at the location indicated by the schedule information the "AUTOANSWER" is not transmitted.

The application 202 may also automatically open an audio path 304 from the radio audio unit 224 to the speaker 124 when a call from a specific device is received. As an illustrative example, the application 202 may receive caller information, and an "IN CALL" flag, from the radio interface unit 220 via the telephony unit 206. The application 202 may compare the received caller information, such as the phone number of the device calling in, to an authorized list of phone numbers stored in the memory of the mobile communication device 100, and may automatically accept the call and open an audio path to the speaker 124 and microphone 126 when the caller information matches a predefined caller stored in authorized list. Since the audio channel is open on both devices an intercom affect is achieved where both parties can communicate with one another over the wireless network.

Figure 5D:
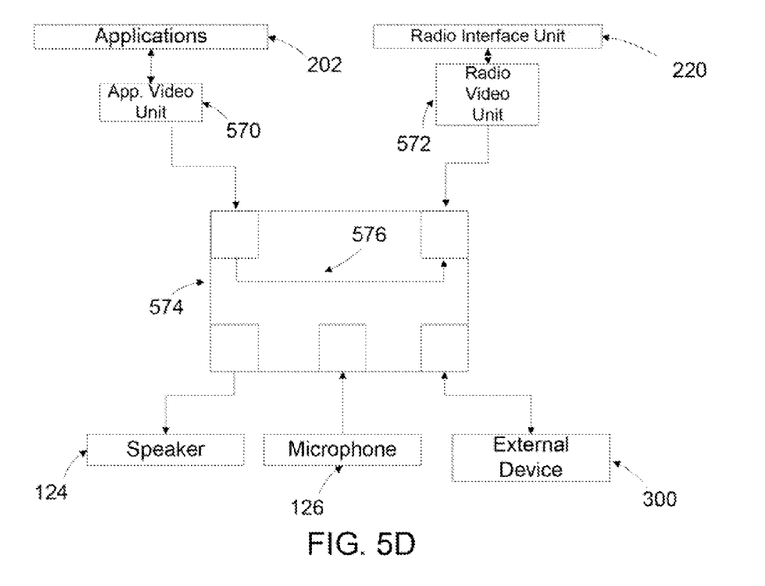
FIG. 5D depicts a schematic representation of the mobile communication device of FIG. 1 that is capable of transmitting video over a wireless network.

FIG. 5D depicts a schematic representation of a mobile device capable of transmitting video over a wireless network. Consistent with this embodiment, the mobile communication device 100 includes a video switching unit 574, an application video unit 570, and a video radio unit 572. The video switch unit 574 is configured to receive a video signal from the application 202, via the application video unit 570, and to transfer the video signal to the radio video unit 572 via the video signal path 576. The application video unit 570 is also configured to format the video signal into a format operable with the radio video unit 572. The radio video unit 572 may also include a plurality of filters to format the video signal for transmission over the wireless network by the hardware driver 226. The mobile communication device 100 may simultaneously transmit video and audio signals over the wireless network via the hardware driver 226. The transmission of the video signal may be initiated by any of the means previously discussed, such as, the receipt of a phone call from an authorized phone number. The video signal may be generated by a camera 578 optically coupled to the application processing unit 102 via the IO unit 116. The camera 578 can be used to record, or generate, the video signal that is transmitted over the wireless network.

Figure 6A:
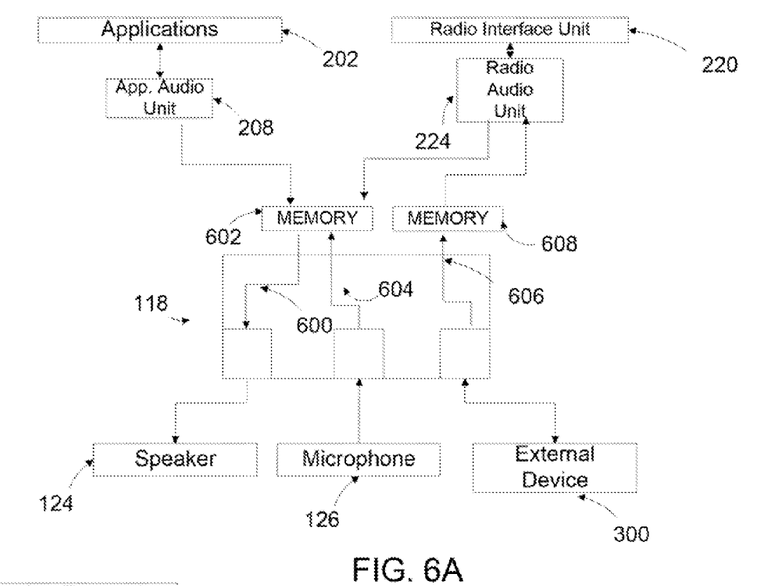
FIG. 6A depicts a configuration of the audio switch unit in the mobile communication device of FIG. 1.

FIG. 6A depicts a configuration of the audio switch unit 118. The audio switch unit 118 is coupled to the speaker 124, microphone 126, application audio unit 208, and radio audio unit 224. The audio framework 206 and the radio audio unit 224 are coupled to the audio switch unit 118 via memory locations 602 and 606. The memory locations 602 and 606 may be partitions of the memory 114, or partitions of the secondary storage unit 122. Further, each memory location 602 and 606 may be partitioned into multiple memory locations.

The radio audio unit 224 stores audio signals received from the driver unit 226 in the memory 602, and the audio switch unit 118 extracts the stored audio form the memory location 602, and transmits the audio signal to the speaker 124 via the audio path 600. The audio switch unit 118 receives audio from the microphone 126, and stores the audio from the microphone 126 in the memory location 602 via audio path 604. The radio audio unit 224 extracts the audio signal from the memory location 602, and transmits the audio signal to the wireless network via the radio interface unit 220 and the driver unit 226. The radio audio unit 224 also stores audio signals received from the wireless network in memory location 602. Similarly, the external device 300 transmits and extracts audio signals from the memory 608 via audio path 606. The application audio unit 208 is also coupled to the memory location 602, and is configured to read and write audio signals into the memory location 602.

Figure 6B:
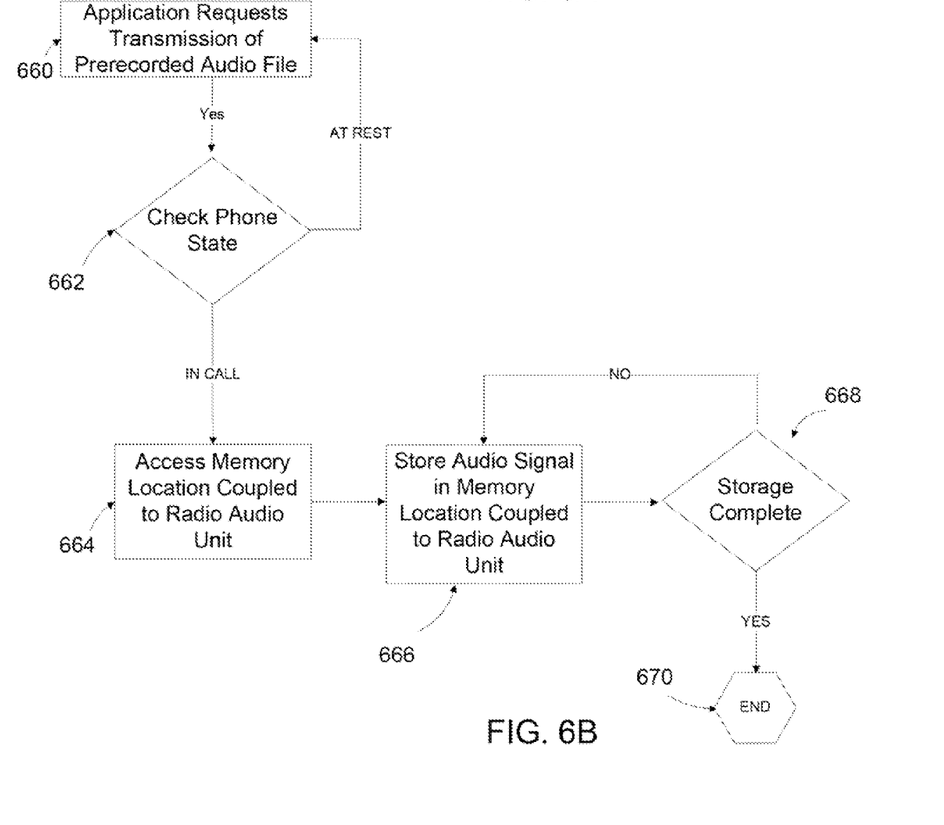
FIG. 6B depicts a schematic representation of a process to transmit an audio signal from the mobile communication device of FIG. 1 over a wireless network.

FIG. 6B depicts a schematic representation of a process to transmit an audio signal over a wireless network. In step 660, the application 202 requests transmission of an audio signal. In step 662, the application 202 checks the status of the radio interface unit 220 via the telephony unit 206. If the radio interface unit 220 returns an "AT REST" status, the application 202 waits for the status to change to an "IN CALL" status. The application 202 may also initiate a call by transmitting a "INITIATE CALL" flag to the radio interface unit 220 via the telephony unit 206. If the application 220 initiates the call, the radio interface unit 220 connects to the wireless network, via the driver unit 226, and performs all required functions to initiate the call over the wireless network. When the intended mobile device accepts the call, the radio interface unit 220 sends an "IN CALL" flag to the telephony unit 206, which forwards the "IN CALL" status to the application 202.

In step 664, the application 202 access the memory location 602 where audio transmitted to the wireless network is stored via the application audio unit 208. The application 202 may transmit a "VIRTUAL CALL" flag to the audio switch unit 118, which causes the audio switch unit 118 to close the audio path 604 between the microphone 126 and the memory location 602. The application 202 may also connect to the microphone 126 and prevent the microphone 126 from transmitting an audio signal to the memory 602.

In step 666, the application 202 routes the audio signal through the application audio unit 208, which formats the audio signal into a format compatible with the radio audio unit 224, and then stores the converted audio signal in the memory 602. The radio audio unit 224 extracts the audio signal from the memory location 602, and transmits the audio signal over the wireless network via the radio interface unit 220 and the driver unit 226. In step 668, the application audio unit 208 determines if the audio signal has been successfully stored in the memory location 602. If the storage is successful, the application 202 ends the process. If the storage is not successful, the application 202 attempts to store the audio signal a second time.

Figure 7A:
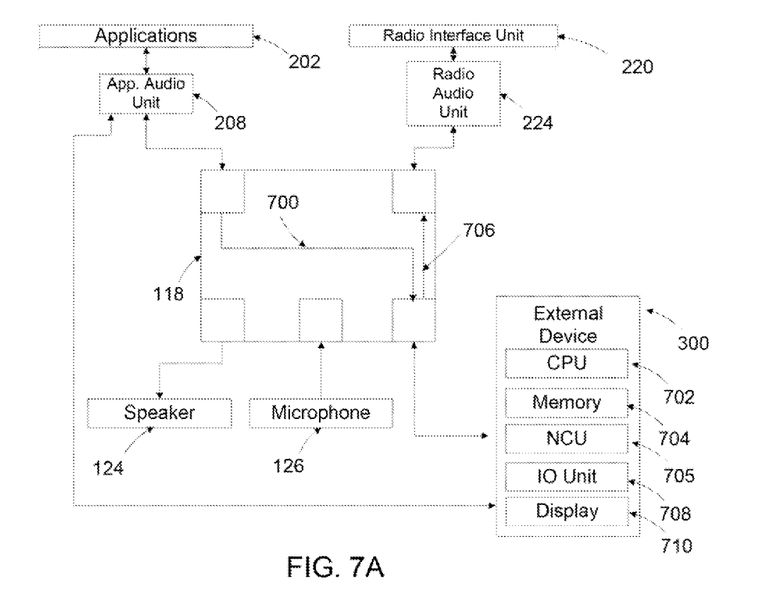
FIG. 7A depicts a schematic representation of the mobile communication device of FIG. 1 connected to an external device that transmits a prerecorded audio signal over a wireless network.

FIG. 7A depicts a schematic representation of the mobile device 100 connected to an external device 300 that transmits a prerecorded audio signal over a wireless network. The external device 300 may be configured to receive audio signals from the application 202 via the application audio unit 208 over the audio path 700. The external device 300 includes a CPU 702, a memory 704 and a network connection unit 705. The external device is configured to receive an audio signal from the application 202, reformat the audio signal into a format accepted by the radio audio unit 224, and transmit the reformatted audio signal to the radio audio unit 224 via the audio path 706. The audio signal may be stored in the memory 704 of the external device 300 for later transmission.

The application 202 may be communicatively coupled to the external device 300, via the network connection unit 705, using a wireless communication protocol such as Bluetooth. The application 202 may also be communicatively coupled to the external device by a wired data bus, such as a universal serial bus (USB) connection, in the external device 300 and in the mobile device 100. The application 202 may also be communicatively coupled to the external device 300 by a network connection, such as a TCP/IP connection or Ethernet connection. The application 202 may also be connected to the external device 300 by a cradle that includes a serial or USB connection to the external device, the cradle being configured to hold the mobile communication device 100 in a predefined position. The application 202 may also be connected to the external device 300 by an audio adapter on the external device 300 that is configured to engage an audio port on the mobile communication device 100

Figure 7B:
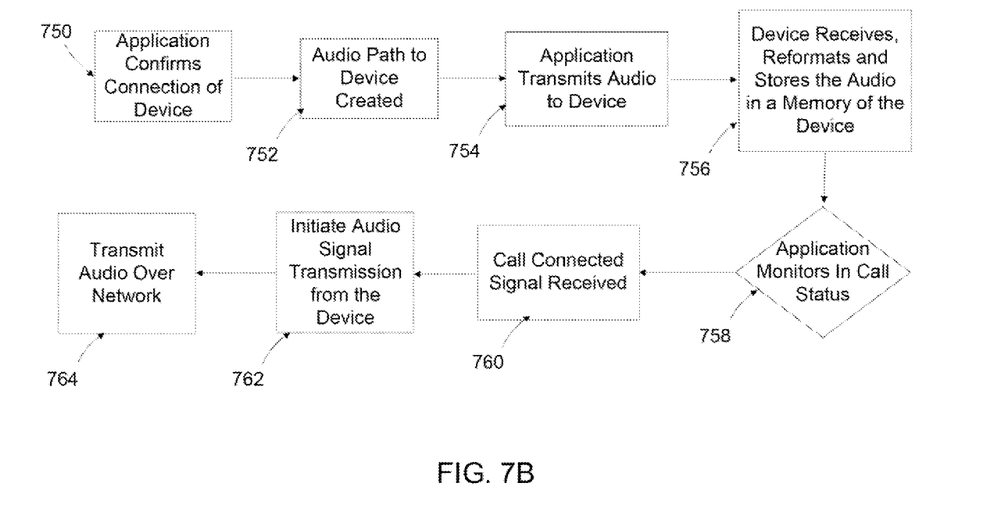
FIG. 7B depicts a schematic representation of a process to transmit an audio signal from an external device over a wireless network through the mobile communication device of FIG. 1.

FIG. 7B depicts a schematic representation of a process to transmit an audio signal from an external device 300 over a wireless network though the mobile communication device 100. When the external device 300 is connected to the mobile device 100, the application 202 requests an audio channel 700 between the external device 300 and the application 202 from the audio switch unit 118 via the application audio unit 208, in step 750. The external device 300 may be communicatively coupled to the mobile communication device 100 using a wireless protocol such as Bluetooth, or by a connector coupled to one end of the external device 300. In step 752, the audio switch unit 118 opens the audio path 700 in response to a request from the application audio unit 208. In step 754, the application 202 transmits the audio signal to the external device 300 via the audio path 700. The external device 300 receives the audio signal, coverts the audio signal in to a format accepted by the radio audio unit 224, and stores the audio signal in the memory 704 in step 756.

After the external device 300 stores the audio file, the application 202 monitors the status of the radio interface device 220 via the telephony unit 206 in step 758. When the radio interface unit 220 transmits an "IN CALL" status to the telephony unit 206, the application 202 transmits an "ACCEPT CALL" flag to the radio interface unit 220, causing the radio interface unit 220 to connect the call via the driver unit 226 in step 760.

In step 762, the application 202 transmits an "START TRANSMISSION" signal to the external device 300 via an established wireless connection or hard wire connection between the external device 300 as previously discussed. In step 764, the external device 300 transmits the stored audio signal to the radio audio unit 224 via the audio path 706. The radio audio unit 224 filters the audio signal before sending the audio signal to the wireless network via the radio interface unit 220 and the driver unit 226. While the example above indicates that the application is operating in the mobile communication device 100, the application may also operate on the external device 300.

The external device 300 may include a plurality of switches coupled to an input/output unit 708 in the external device. An application operating in the memory 704 of the external device 300 monitors the status of each switch, and changes the operation of the external device 300 based on the status of the switches. As an illustrative example, when a first switch is selected, the application may transmit audio signals received from the mobile communication device 100 to a head set coupled to the external device 300. When a second switch is selected the application may initiate an auto answer mode where the external device 300 transmits audio signals stored in the memory 704 of the external device 300 over the wireless network via the mobile communication device 100. When a third switch is selected, the application may initiate a call conversion mode where audio signals received by the external device 300 are analyzed by an application operating in the memory 704 of the external device 300. When a fourth switch is selected, the application may receive audio signals transmitted from a microphone coupled to the external device 300, convert the audio signals into a digital format, and store the audio signals in the memory 704 of the external device 300. The switches may be push buttons. Further, the application may also initiate different modes based on the engagement of a combination of switch.

The external device 300 may also include a display unit 710. The display unit 710 may be configured to display a menu that allows users to select different modes of operation for the external device 300. The display unit 300 may also be configured to display information pertaining to the external device 300 and the files stored in the memory 704 of the external device 300. As an illustrative example, the display unit 710 may display a list of recordings stored in the memory 704 of the external device 300. The display unit 710 may be logically coupled to at least one of the switches such that the selection of a switch will correspond to an action described on the display unit 710. As another illustrative example, the selection of a switch may allow a user to listen to a specific audio file stored in the memory 704 of the external device 300. The display unit 710 may also display information pertaining to the association of the audio files stored in the memory 704 to different operational modes of the external device 300.

In the call conversion mode, audio signals received from the wireless network, or from the microphone coupled to the external device 300, are converted into text using conventional voice recognition software algorithms that are widely known in the art. Examples of voice recognition applications include Dragon Naturally Speaking and Microsoft's Text to Speech. The external device 300 may analyze the converted audio signal for keywords, and initiate different modes based on the identified keywords. The user of the mobile communication device 100 may store a list of keywords, and associated operating modes, in the memory 704 of the external device 300.

As an illustrative example, the external device 300 may receive an audio signal that includes the word "emergency." A user of the mobile communication device 100 may previously configure the external device 300 to automatically notify the user of the mobile communication device 100 of any received audio signal including the word "emergency" by playing an audio tone on the speaker of the mobile communication device 100. Further, the external device 300 may be configured to enter a vehicle mode when an audio signal is received which includes the phrase "mobile device is docked in a vehicle." The external device 300 may also be configured to initiate any other operational mode based on a keyword previously identified a user of the mobile communication device 100.

Figure 8A:
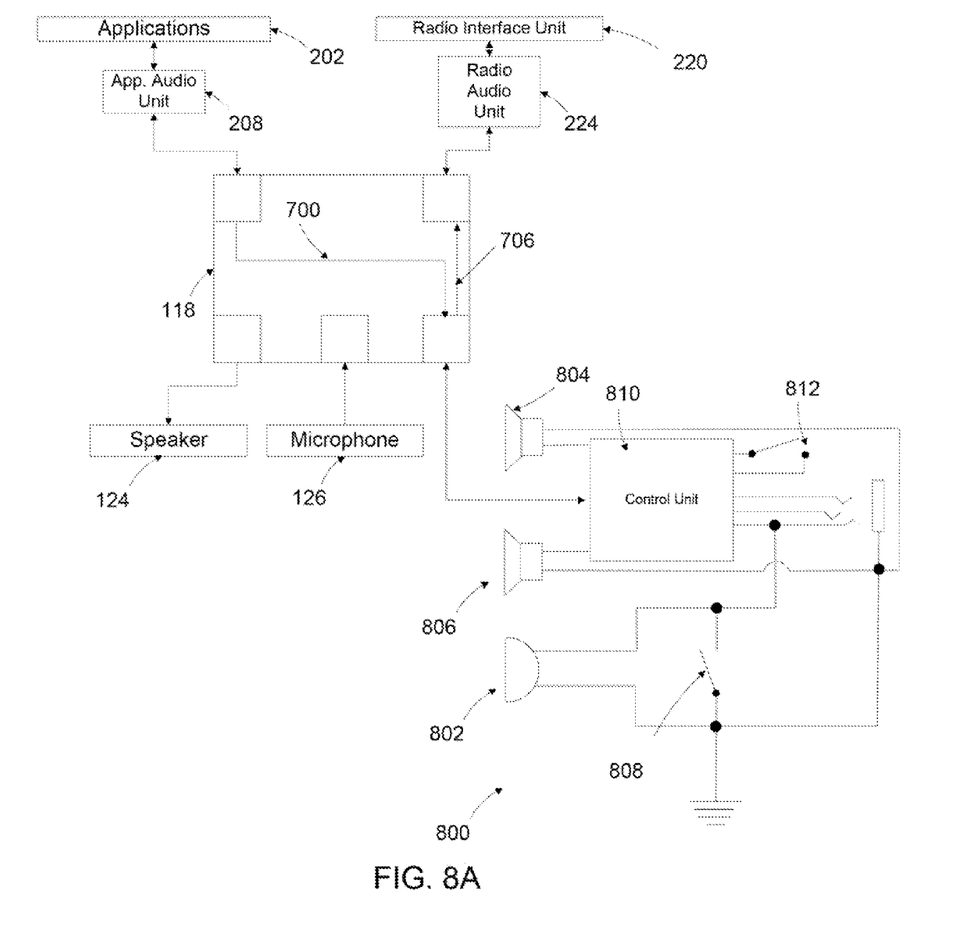
FIG. 8A depicts an external device that is configured to transmit an audio signal over a wireless network.

FIG. 8A depicts an external device 800 that is configured to transmit an audio signal over a wireless network. The external device 800 includes a microphone input 802, a right speaker output 804, a left speaker output 806, a send/end input 808, and a control unit 810. The control unit 810 may also be provided separate from the speakers 804, 806 and microphone 810. The control unit 810 is communicatively coupled to the audio switch unit 118. The control unit 810 may be coupled to the audio switch unit 118 by an audio adapter, a wireless communication unit, or by any other audio connection. When a call is received, the audio switch unit 118 opens an audio path between the control unit 810 and the application audio unit 208 using any of the methods previously described. The control unit 810 is configured to receive the audio signal and transmit a control signal to the application audio unit 208 based on the operational mode of the external device 800.

In a first mode, when the switch 812 is engaged, the control unit 810 transmits a control signal to the application audio unit 208 by the audio switch unit 118 via audio path 700. The application audio unit 208 receives the control signal, opens an audio path to the radio interface unit 220, and transmits an audio signal stored in the memory 114 of the mobile communication device 100 using any of the previously discussed methods. When the switch is not engaged, the control unit 810 passes the audio signal to the right speaker output 804 and the left speaker output 806. The control unit 810 also transmits audio signals from the microphone 802 to the mobile communication device 100.

The external device 800 may also be a docking station in a car that allows a user to mount and charge mobile communication device 100. The external device 800 is configured to identify when a mobile communication device 100 is engaged with the docking. When the mobile communication device 100 is docked in the docking station, the control unit 810 transmits a control signal to the application audio unit 208 to transmit audio signals from the memory 114 of the mobile communication unit 100 in response to a received call.

Figure 8B:
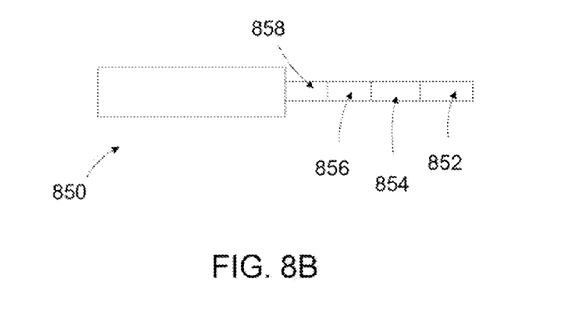
FIG. 8B depicts a connection unit for the external device

FIG. 8B depicts a connection unit 850 for the external device 800. The connection unit 850 includes a left speaker connector 852, a right speaker connector 854, a common electrical connector 856, and a microphone/call-end connector 858. The left speaker connector 852 receives an audio signal from the audio switch unit 118 that is transmitted to the left speaker. The right speaker connector 854 receives an audio signal from the audio switch unit 118 that is transmitted to the right speaker. The microphone call-end connector 858 transmits an audio signal captured by a microphone to the audio switch unit 118.

In the present disclosure, the words "a" or "an" are to be taken to include both the singular and the plural. Conversely, any reference to plural items shall, where appropriate, include the singular.

It should be understood that various changes and modifications to the presently preferred embodiments disclosed herein will be apparent to those skilled in the art. Such changes and modifications can be made without departing from the spirit and scope of the present disclosure and without diminishing its intended advantages. It is therefore intended that such changes and modifications be covered by the appended claims.

We claim:

1. A message injection system including a communication device and an external device:
   the communication device including
   a memory;
   a processor;
   an audio switching unit;
   a radio interface unit communicatively coupled to the audio switching unit and to a cellular communication network; and
   an application operating in the memory;
   the external device including
   a memory;
   a processor;
   a plurality of audio files stored in the memory; and
   a connection unit communicatively coupled to an application in the communication device via a first communication connection, and to the audio switching unit via a second communication connection,
   wherein the application in the communication device transmits a request for the external device to broadcast at least one selected file stored in the memory of the external device to a receiving device communicatively coupled to the cellular network via the radio interface unit and the second communication connection with the audio switching unit.

2. The message injection system of claim 1 including a second connection unit coupled to an external device.

3. The message injection system of claim 2 wherein the external device is a microphone headset.

4. The message injection system of claim 1 wherein the external device includes a plurality of switch units.

5. The message injection system of claim 4 wherein the application in the external device changes an operational mode of the connection unit when at least one of the plurality of switches is selected.

6. The message injection system of claim 1 including a display unit in the external device that is configured to display information from the memory.

7. The message injection system of claim 6 wherein the application in the external device displays a listing of files stored in the memory.

8. The message injection of claim 7 wherein the information displayed on the display unit is a listing of audio signals stored in the memory of the external device.

9. The message injection system of claim 1 wherein the application in the external device changes the operational mode of the connection unit based on an identified keyword in the selected audio file.

10. A message injection apparatus including:
a first audio output unit;
a second audio output unit;
a plurality of audio files stored in the memory;
a microphone input unit;
a control unit coupled to the first audio output unit, second audio output unit and microphone input unit,
wherein the control unit is communicatively coupled to an application in a communication device and an audio switching unit in the communication device via two separate communication connections,
the audio switching unit in the communication device is communicatively coupled to a cellular network via a radio interface unit, the application in the communication device transmits a request for the control unit to broadcast at least one audio file stored in the memory of the apparatus to a receiving device connected to the cellular network via the first communication connection, and the control unit transmits the selected audio file to the radio interface unit via the second communication connection and the audio switching unit.

11. The message injection apparatus of claim 10 wherein the apparatus is a docking unit in a vehicle.

12. The message injection apparatus of claim 10 including a switch unit coupled to the control unit.

13. The message injection apparatus of claim 12 wherein the control unit changes the operational mode based on a signal from the switch unit.

* * * * *

UNITED STATES PATENT AND TRADEMARK OFFICE
CERTIFICATE OF CORRECTION

PATENT NO. : 9,088,815 B2  
APPLICATION NO. : 13/347476  
DATED : July 21, 2015  
INVENTOR(S) : Douglas Scott Selph et al.

Page 1 of 1

It is certified that error appears in the above-identified patent and that said Letters Patent is hereby corrected as shown below:

On Title Page, item (75), Inventors line 5 "Gumee" to read as --Gurnee--.
On Title Page, item (75), Inventors line 6 "Slingerlande" to read as --Slingerlands--.

In the Specification
Column 1, line 54, "mode" to read as --mode.--.
Column 2, line 42, "device" to read as --device.--.
Column 8, line 2, "AUTOANSWER" to read as --AUTO ANSWER--.
Column 10, line 3, "100" to read as --100.--.

In the Claims
Column 13, line 11 approx., Claim 8, "injection of" to read as --injection system of--.

Signed and Sealed this
Sixteenth Day of February, 2016

Michelle K. Lee
*Director of the United States Patent and Trademark Office*